United States Patent [19]

Natarajan et al.

[11] Patent Number: 5,296,550
[45] Date of Patent: Mar. 22, 1994

[54] IMPACT MODIFIED POLYESTER BLENDS WITH IMPROVED POLYMER COMPATIBILITY

[75] Inventors: Kavilipalayam M. Natarajan, North Brunswick; Palanisamy Arjunan, Dayton; David Elwood, Palisades Park, all of N.J.

[73] Assignee: Enichem S.p.A., Italy

[21] Appl. No.: 786,578

[22] Filed: Nov. 1, 1991

[51] Int. Cl.$^5$ .............................................. C08F 8/00
[52] U.S. Cl. ...................................... 525/170; 525/179
[58] Field of Search ............................... 525/170, 179

[56] References Cited

U.S. PATENT DOCUMENTS 4,172,859 10/1979 Epstein .................................. 428/402
4,454,284 6/1984 Ueno et al. ............................ 524/427

FOREIGN PATENT DOCUMENTS 63-113056 5/1988 Japan .
1-9254 1/1989 Japan ...................................... 23/10
8503718 8/1985 PCT Int'l Appl. .
8905838 6/1989 PCT Int'l Appl. .

OTHER PUBLICATIONS

*Hawley's Condensed Chemical Dictionary*, (12th Edition, Lewis, Ed., Van Nostrand Reinhold Co., New York 1993), pp. 851, 938 and 942.

Primary Examiner—Paul R. Michl
Assistant Examiner—Edward Cain
Attorney, Agent, or Firm—Lerner, David, Littenberg, Krumholz & Mentlik

[57] ABSTRACT

A moldable polyblend of thermoplastic polyesters, one or more polymers selected from polyamides, polyolefins and mixtures thereof, and ethylene copolymers containing epoxy groups. The ethylene copolymers contribute improved compatibility between the thermoplastic polyesters and the polyamides or polyolefins, permitting the blending of these polymers without detracting from the mechanical or thermal properties of the individual polymers.

38 Claims, No Drawings

IMPACT MODIFIED POLYESTER BLENDS WITH IMPROVED POLYMER COMPATIBILITY

BACKGROUND OF THE INVENTION

The present invention relates to moldable polyblends of thermoplastic polyesters blended with an ethylene copolymer containing epoxy groups, which ethylene copolymer contributes both improved impact strength and improved polymer compatibility to the blend. In particular, the present invention relates to moldable polyblends of thermoplastic polyesters and an ethylene-ethyl acrylate-glycidyl methacrylate (EEA-GMA) impact modifier having improved compatibility with polyamides and polyolefins.

Thermoplastic polyesters are a widely used class of thermoplastic molding polymers selected for their good balance of physical properties. The impact properties of these polymers can be improved by compounding with elastomeric polymer impact modifiers.

The versatility of thermoplastic polyesters has made it desirable to blend these polymers with other thermoplastic molding polymers. For example, it would be desirable to blend thermoplastic polyesters with higher-cost polyamides such as nylons to form a more economical polyblend. The polyblend would also exhibit lower moisture absorption when compared to the polyamide, thereby improving the dimensional stability of the molded parts of the polyblends. It would also be desirable to blend thermoplastic polyesters with lower-cost polyolefins such as polyethylene or polypropylene to form a highly economical polyblend possessing good impact strength and solvent resistance characteristics of the polyester.

Until now, it has not been possible to blend thermoplastic polyesters with these polymers because these polymers do not form compatible polyblends with thermoplastic polyesters. The incompatibility results in a reduction of the mechanical properties of the polyblend.

Ethylene copolymers containing epoxy groups are known impact modifiers of thermoplastic polyesters. U.S. Pat. No. 4,172,859 includes such copolymers among the thousands of suitable elastomeric impact modifiers disclosed for thermoplastic polyesters. Ethylene-methyl acrylate-glycidyl methacrylate is illustrated as an impact modifier for polybutylene terephthalate. However, none of the elastomeric impact modifiers of U.S. Pat. No. 4,172,859 are disclosed as improving the compatibility of thermoplastic polyesters with polyamides or polyolefins.

Published PCT Application 89-5,838 discloses the use of ethylene copolymers containing epoxy groups as impact modifiers for thermoplastic polyesters, but contains no disclosure regarding the impact modification of blends of thermoplastic polyesters and polyamides or polyolefins. Improvement of the impact properties of polyester molding compositions by the addition of ethylene copolymers containing epoxy groups is also disclosed in published PCT Application Publication No. WO 85/03718. This prior art reference also contains no disclosure regarding the impact modification of blends of thermoplastic polyesters and polyamides or polyolefins.

Japanese Kokai 63-113,056 discloses blends of thermoplastic polyesters and ethylene copolymers containing epoxy groups having an excellent balance of low-temperature impact strength, rubber elasticity, heat resistance, wear resistance, chemical resistance, cold strength and rigidity. However, this prior art reference also contains no disclosure regarding blends of thermoplastic polyesters and polyamides or polyolefins. Japanese Kokai 64-9,254 discloses a polyblend of polypropylene, a polyolefin, blended with an ethylene copolymer containing epoxy groups, which functions as an impact modifier to improve the low temperature impact strength and coatability of the polypropylene. There is no disclosure in this prior art reference regarding the blending of the polypropylene with thermoplastic polyesters.

U.S. Pat. No. 4,454,284 discloses blends of poly(phenylene ethers) with thermoplastic polyesters and ethylene copolymers containing epoxy groups, which improve the workability and impact strength of the poly(phenylene ether). There is no disclosure in this reference that thermoplastic polyesters and ethylene copolymers containing epoxy groups can also be blended with polyamides and polyolefins. There remains a need for multiple polyblends of thermoplastic polyesters or impact modified thermoplastic polyesters with polyamides and polyolefins.

SUMMARY OF THE INVENTION

It has now been discovered that ethylene copolymers containing epoxy groups are not only excellent impact modifiers of thermoplastic polyesters, these impact modifiers also compatibilize polyblends of thermoplastic polyesters with polyamides or polyolefins. Therefore, in accordance with the present invention, there is provided a thermoplastic molding composition prepared from a polyblend of a thermoplastic polyester with either a polyamide, a polyolefin, or a mixture of the two polymers and an ethylene copolymer containing epoxy groups having the formula:

X/Y/Z wherein

X is a monomeric unit formed from ethylene, present in the copolymer in amounts of from about 50 to about 95 weight percent;

Y is a monomeric unit formed from vinyl acetate, or an acrylate monomer having the structure:

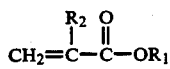

in which $R^1$ is an alkyl or cycloalkyl group containing from about 1 to about 12 carbon atoms, or a phenyl or alkylphenyl group, the alkyl portion of which contains from about 1 to about 12 carbon atoms. $R_2$ is selected from hydrogen, methyl and ethyl, and Y is present in the copolymer in a range of from about 4 to about 35 weight percent; and Z is a monomeric unit containing an epoxy group selected from monomers such as glycidyl acrylate and glycidyl methacrylate, present in the copolymer in a range of from about 1 to about 15 weight percent.

The ethylene copolymers containing epoxy groups of the present invention are a class of thermoplastic elastomers suitable for molding, but having substandard thermal properties and processability. However, the properties of these elastomers can be improved by blending with thermoplastic polyesters to improve processability, and by blending with a polyamide or a polyolefin to improve the thermal properties. The thermoplastic polyblends of the present invention will therefore include polyblends in which the thermoplastic polyester predominates, polyblends in which the polyamide or polyolefin predominates, and polyblends in which the ethylene copolymer containing epoxy groups predominates. It is therefore in accordance with the present invention that the thermoplastic polyblends contain between about 5 and about 85 percent by weight of a thermoplastic polyester, between about 5 and about 85 percent by weight of a polymer selected from polyamides, polyolefins and mixtures thereof, and between about 1 percent and about 40 percent by weight of an ethylene copolymer containing epoxy groups.

In accordance with the present invention, there is also provided a method for producing a molded polyblend by forming a polyblend of a thermoplastic polyester, a polymer selected from polyamides, polyolefins and mixtures thereof, and an ethylene copolymer containing epoxy groups and then molding the formed polyblend.

While not being bound by any particular theory, the polyamides and polyolefins of the present invention are not believed to share any common characteristic that accounts for these polymers being compatibilized with thermoplastic polyesters by ethylene copolymers containing epoxy groups. The polymers are generically distinct and it is believed that differing functional groups on each polymer operate to compatibilize the polymer with the ethylene copolymers containing epoxy groups and the thermoplastic polyester. Furthermore, each polymer type is being blended with the polyester for a different purpose.

DETAILED DESCRIPTION OF THE PREFERRED EMBODIMENT

The multiple polyblends of the present invention contain thermoplastic polyesters. The thermoplastic polyesters utilized in the multiple polyblends of the present invention may be any such polyester suitable for use in thermoplastic molding compositions. The preferred polyesters include the condensation products of dicarboxylic acids and diols. The dicarboxylic acid component of more preferred polyesters contains at least 20% aromatic dicarboxylic acids selected from terephthalic acid, isophthalic acid, napthalene dicarboxylic acid, diphenylether dicarboxylic acid, diphenyl dicarboxylic acid, diphenylsulfone dicarboxylic acid, diphenoxyethane dicarboxylic acid and the like. The non-aromatic component of the dicarboxylic acid is selected from succinic acid, adipic acid, sebacic acid and the like.

The diol component of more preferred polyesters may be selected from aliphatic diols containing from 2 to 10 carbon atoms. Such diols include ethylene glycol, diethylene glycol, trimethylene glycol, tetramethylene glycol and the like.

Even with preferred polyesters or poly(alkylene terephthalates) characterized in general by structural units of the formula:

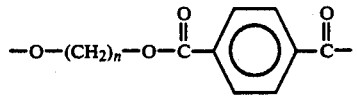

wherein n is an integer between 2 and 6. The most preferred polyester is poly(ethylene terephthalate) (PET). Suitable thermoplastic polyesters are further characterized as having intrinsic viscosities between about 0.4 and about 1.5 g/dL and preferably between about 0.6 and about 1.1 g/dL. The intrinsic viscosities are obtained by extrapolation of viscosity values to zero concentration of solutions of the polyester in a 60/40 vol./vol. ratio blend of 1,1,2,2-tetrachloroethane and phenol at 25° C. Essentially, any thermoplastic polyester suitable for use in molding compositions can be utilized with the present invention. Such polyesters are taught by U.S. Pat. No. 2,465,319 and may be derived by the preparation method disclosed therein and by U.S. Pat. No. 3,047,539, both of which are hereby incorporated herein by reference thereto.

The amount of thermoplastic polyester utilized should be that quantity efficient to provide desired properties of the particular thermoplastic polyester to the blend, in particular, impact strength, solvent resistance, and, for polyamide blends, dimensional stability. As noted above, the polyblend can contain from about 5 percent to about 85 percent by weight thermoplastic polyester. Preferably, the polyblend will contain from about 30 percent to about 70 percent by weight of the thermoplastic polyester.

The thermoplastic multiple polyblends of the present invention also include polymers selected from polyamides, polyolefins or mixtures thereof. The polyamides utilized in the multiple polyblends of the present invention may be any such polyamide suitable for use in thermoplastic molding compositions. Preferred polyamides are nylons, which may be prepared by condensing equimolar amounts of a saturated dicarboxylic acid having from 4 to 12 carbon atoms and a diamine of 4 to 14 carbon atoms, or by condensing omega-amino carboxylic acids or by a poly-addition reaction of lactams.

Partially crystalline or amorphous nylons are suitable for use with the present invention, however, partially crystalline nylons are preferred, because the molded articles produced therefrom are superior to amorphous nylons with respect to heat distortion resistance and stress crack resistance. Preferred nylons include polyhexamethylene adipamide (nylon 6,6), polyhexamethylene azelaic acid amide (nylon 6,9), polyhexamethylene sebacic acid amide (nylon 6,10), polyhexamethylene dodecanedicarboxylic acid amide (nylon 6,12), polycaprolactam (Nylon 6), polylaurolactam, poly-11-amino-undecanoic acid, and poly-di-(p-aminocyclohexyl)-methane-dodecanedicarboxylic acid amide. Preferred nylons also include nylon obtained by copolycondensation of two or more of the above polymers, or of their components, such as a copolymer of adipic acid, sebacic acid and hexamethylenediamine. Preferred nylons are linear and have melting points above 200° C. These and further suitable polyamides are taught by U.S. Pat. Nos. 2,071,250; 2,071,251; 2,130,523; 2,130,948; 2,241,322; 2,312,966; 2,512,906 and 3,393,210, the teachings of all of which are hereby incorporated herein by reference thereto.

The more preferred nylons for use in the polyblend compositions of the present invention include polyhexamethylene adipamide, polyhexamethylene sebacic acid amide and polycaprolactam. The most preferred nylon is polycaprolactam. Blends of the above nylons may also be employed.

The polyamide resins useful in the practice of the invention have a number average molecular weight of at least 20,000 daltons. Any higher molecular weight commercially available polyamide resin would otherwise be suitable.

The amount of polyamide utilized should be that quantity sufficient to provide the blend with the solvent resistance and toughness of the polyamide in particular. As noted above, the polyblend can contain from about 5 percent to about 85 percent by weight of polyamide. Preferably, the polyblend will contain from about 30 percent to about 70 percent by weight of polyamide.

The polyolefins utilized in the multiple polyblends of the present invention may be any such polyolefins suitable for use in thermoplastic molding compositions. Preferred polyolefins include polyethylene, including HDPE, LDPE, LLDPE, etc., polypropylene and ethylene-propylene copolymers. Polyethylene and polypropylene are the more preferred polyolefins.

Suitable polyolefins are further characterized as having a melt index between about 1.0 and about 3.0 as measured pursuant to ASTM D-1238. A melt index of 2.0 is preferred. Essentially, any thermoplastic polyolefins suitable for use in molding compositions can be utilized with the present invention. The polyolefins which can be employed in the formulation of the blends of the present invention are commercially available and therefore well known in the art and essentially conventional.

The amount of polyolefin utilized should be that quantity sufficient to improve the economy of the blend without detracting from the thermal and mechanical properties of the blend. As noted above, the polyblend can contain from about 5 percent to about 85 percent by weight polyolefin. Preferably, the polyblend will contain from about 30 percent to about 70 percent by weight of polyolefin.

The thermoplastic multiple polyblends of the present invention also include an ethylene copolymer containing epoxy groups. Ethylene copolymers containing epoxy groups suitable for use in the present invention are characterized by the formula:

X/Y/Z

X is a monomeric unit formed from ethylene, and is present in the copolymer in a range from about 50 to about 95 weight percent. Preferably, X is present in the copolymer and a range from about 60 to about 84 weight percent.

Y is a monomeric unit formed from vinyl acetate or an acrylate monomer having a the structure:

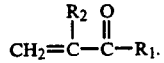

$R_1$ is an alkyl or cycloalkyl group containing from about 1 to about 12 carbon atoms and preferably from about 1 to about 6 carbon atoms. $R_1$ is most preferably an ethyl group. $R_1$ can also be a phenyl or alkylphenyl group, the alkyl portion of which contains from about 1 to about 12 carbon atoms, and preferably from about 1 to about 6 carbon atoms. $R_2$ is either hydrogen, methyl or ethyl, and is preferably hydrogen. Y is most preferably acrylate. Y is also preferably vinyl acetate. Y is present in the copolymer in a range from about 4 to about 35 weight percent, and is preferably present in the copolymer in a range from about 15 to about 30 weight percent.

Z is monomeric unit containing an epoxy group and is selected from monomers such as glycidyl acrylate and a glycidyl methacrylate. Z is preferably glycidyl methacrylate. Z is present in the copolymer in a range from about 1 to about 15 weight percent, and is preferably present in the copolymer in a range from about 1 to about 10 weight percent.

The ethylene copolymer containing epoxy groups can be either a random or block copolymer. Block copolymers contribute greater impact modifying properties and are therefore preferred.

The ethylene copolymers containing epoxy groups suitable for use in the present invention can be prepared by well-known direct random or block copolymerization methods. For example, each of the three monomers X, Y and Z can be combined in the presence of a free-radical polymerization initiator at elevated temperatures and at elevated pressures, as disclosed in published PCT application 85-03718, the disclosure of which is hereby incorporated herein by reference thereto. The ethylene copolymers containing epoxy groups are characterized by a melt flow of between about 2 and about 15 g/10 min. at 190° C. with a 2.16 g weight as determined by ASTM D-1238.

The amount of ethylene copolymer containing epoxy groups utilized should be that quantity sufficient to compatibilize the thermoplastic polyester with the polyamide or polyolefin in particular. As noted above, the polyblend can contain from about 1 percent to about 40 percent by weight of the ethylene copolymer containing epoxy groups. Preferably, the polyblend will contain from about 5 percent to about 30 percent by weight of the ethylene copolymer containing epoxy groups.

The moldable polyblend of the present invention is suitable to produce molded articles using conventional molding apparatus. As such, the polyblend can optionally contain amounts from about 0 to about 50 percent by weight of the total formula weight of art-recognized additives such as pigments, fillers, stabilizers, fire retardants, lubricants, vulcanizing agents, antidegradants, antioxidants, processing aids, adhesives, tackifiers, plasticizers, prevulcanization inhibitors, discontinuous fibers such as wood or cellulose fibers, extender oils, mold-release agents, accelerators and nucleating agents. The moldable polyblend can also optionally contain in amounts from about 0 to about 50% by weight of impact modifiers other than ethylene copolymers containing epoxy groups.

The moldable polyblend of the present invention can be prepared using any art-recognized method for blending polymers. For example, the polymers can be dry blended at room temperature followed by melt mixing at a temperature above the softening points of the polymers using any conventional melt-mixing apparatus including extruders, calenders, kneaders, Brabender-type mixers and the like, preferably at a temperature between about 270° C. and about 300 C. An initial preblend can be formed of the ethylene copolymer containing epoxy groups and the thermoplastic polyester, to which the polyamide or polyolefin and any optional ingredients can be added.

A particularly useful blend of the present invention contains from about 30 percent to about 70 percent by weight of a thermoplastic polyester, from about 30 percent to about 70 percent by weight of polymers selected from polyamides, polyolefin and mixtures thereof and from about 5 percent to about 30 percent by weight of an ethylene copolymer containing epoxy groups. Preferably, the thermoplastic polyester is PET, the polyamide is polycaprolactam, the polyolefin is low density polyethylene, and the ethylene copolymer containing epoxy groups is EEA-GMA.

The molding compositions of the present invention can be directly injection molded, melt spun, cast or extruded by conventional methods well known to those of ordinary skill in the art. The compositions of the present invention are particularly useful to make injection-molded articles.

The following non-limiting examples set forth hereinbelow illustrate certain aspects of the invention, but are not meant in any way to restrict the effective scope of the invention. All parts and percentages are by weight unless otherwise noted, and all temperatures are in degrees Celsius.

EXAMPLES

EXAMPLES 1-2

A mixture of 60% Nylon 6 (Nivionplast 273 MR from EniChem) and 40% PET was dry blended at room temperature. A portion of this blend was set aside as a control. The balance was then dry blended in an 85%-15% ratio with Lotader AX 8660, an EEA-GMA from Norsolor of Paris, France, so that the ratio of Nylon 6 to PET to EEA-GMA was 51:34:15. The Nylon 6 had a number average molecular weight of 20,000. The PET had an intrinsic viscosity of 0.60 g/dL measured in a 60/40 vol./vol. ratio blend of 1,1,2,2-tetrachloro-ethane and phenol at 25° C. The EEA-GMA had a melt flow of about 4.0. The weight-percentage formulations are listed in Table I, with the sample of Example 1 prepared as a control.

TABLE I

| Example | 1 | 2 |
|---|---|---|
| Nylon 6 | 60 | 51 |
| PET | 40 | 34 |
| EEA-GMA | — | 15 |
| Tensile Strength (psi) | 10,000 | 7,500 |
| Elongation (%) | 8.5 | 76.0 |
| Notched Izod (Ft. Lbs./In.) | 0.9 | 3.7 |
| Dynatab Impact (Ft. Lbs.) | 1.2 | 42.0 |

The Nylon 6/PET blend was dried in a dehumidifying oven at 110° C. for 48 hours. The blend was removed and cooled in a dry environment and the sample of Example 2 was prepared by dry blending a portion of the blend with the EEA/GMA. The blend was then extruded using a Leistritz twin-screw extruder and pelletized. The melt temperature was 270° C.

The compounded pellets were dried again for six hours at 120° C. prior to injection molding with a Nissei 80T injection molding machine. Test specimens such as tensile bars, flexural bars and discs were molded. The melt temperature was 270° C. The injection pressure was 12,000 psi. The total cycle time for molding was 55 seconds. The physical properties of the samples were tested for tensile strength and elongation according to ASTM D-638 and impact strength (Notched Izod according to ASTM D-256 and Dynatab Impact according to ASTM D-3763. The physical properties of the samples are also shown in Table I.

The sample of Example 2 containing EEA-GMA shows significantly improved impact properties over the control sample containing no EEA-GMA. There was a reduction in the tensile strength, but not comparable in scale to the increase in impact properties. The significant improvement in the tensile elongation of the blends with the EEA-GMA clearly indicates that the EEA-GMA additive is acting as a compatibilizing agent. The impact strength of the PET/Nylon 6 blend is also improved when the EEA-GMA is added, which indicates that the EEA-GMA is also an impact modifier for the PET/Nylon 6 blends.

The foregoing establishes that the impact strength and compatibility of blends of thermoplastic polyesters and polyamides can be improved by the addition of ethylene copolymers containing epoxy groups without sacrificing the important physical performance properties of the polyamide.

EXAMPLES 3-5

The PET of Example 1 was dried at 110° C. for 48 hours and was then cooled under dry environment prior to dry-blending the 70:30 ratio with low density polyethylene having a Melt Index of 2.0 (Petrothene NA 82000, USI). A portion of this blend was set aside as the control sample of Example 3, as shown in Table II. The balance was then dry-blended in the ratios shown for Examples 4 and 5 of Table II with the EEA-GMA of Example 1. All three blends were then extruded in a Leistritz twin-screw extruder and pelletized. The melt temperature was 270° C.

The compounded pellets were dried again in a vacuum for 8 hours at 80° C. prior to injection molding with a Nissei 80T injection molding machine. Test specimens such as tensile bars, flexural bars and discs were molded. The melt temperature was 270° C. The injection pressure was 8,000 psi. The total cycle time for molding was 45 seconds. The physical properties of the samples were tested for tensile strength and elongation, and Notched Izod impact strength as in Example 1. The physical properties of the samples are also shown in Table II.

TABLE II

| EXAMPLE | 3 | 4 | 5 |
|---|---|---|---|
| PET | 70 | 63 | 56 |
| LDPE | 30 | 27 | 24 |
| EEA-GMA | — | 10 | 20 |
| Tensile Strength (psi) | 4650 | 3600 | 2750 |
| Elongation (%) | 21.5 | 152 | 125 |
| Notched Izod (Ft. Lbs./In.) | 0.3 | 3.5 | 1.4 |

As depicted in Table II, the samples of Examples 4 and 5, containing the EEA-GMA compatibilizer exhibit significantly improved impact properties over the control samples. Tensile elongation of the samples of Examples 4 and 5 are also higher than the control. As with the samples of Examples 1 and 2, the improvement in the tensile elongation of the blends with the EEA-GMA clearly indicates that the EEA-GMA additive is acting as a compatibilizing agent. The impact strength of the blends are also improved when the EEA-GMA is added, which indicates that the EEA-GMA is also an impact modifier for the PET/polyethylene blends. The above clearly shows that the impact strength and the compatibility of the PET/polyethylene blends can be improved by the addition of ethylene copolymers containing epoxy groups.

As will be readily appreciated, numerous variations and combinations of the features set forth above can be utilized without departing from the present invention as set forth in the claims. Such variations are not regarded as a departure from the spirit and scope of the invention, and all such modifications are intended to be included within the scope of the following claims.

What is claimed is:

1. A thermoplastic molding composition comprising:
a first polymer comprising a thermoplastic polyester;
one or more second polymers suitable for use in thermoplastic molding compositions and selected from the group consisting of polyamides, polyolefins and mixtures thereof; and
an ethylene copolymer containing epoxy groups represented by the formula:

X/Y/Z wherein
X is a monomeric unit formed from ethylene and comprises from about 50 to about 95 weight percent of said copolymer;
Y is a monomeric unit formed from a monomer selected from the group consisting of vinyl acetate and acrylate monomers having the structure:

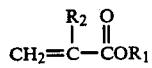

in which
$R_1$ is selected from the group consisting of alkyl and cycloalkyl groups containing from about 1 to about 12 carbon atoms and phenyl and alkylphenyl groups, the alkyl portion of which contains from about 1 to about 12 carbon atoms; $R_2$ is selected from the group consisting of hydrogen, methyl and ethyl; and Y comprises from about 4 to about 35 weight percent of said copolymer; and
Z is a monomeric unit formed from a monomer containing an epoxy group selected from the group consisting of glycidyl acrylate and glycidyl methacrylate, wherein Z comprises from about 1 to about 15 weight percent of said copolymer.

2. The composition of claim 1, wherein said thermoplastic polyester is present within the range of from about 5 to about 85 weight percent of said polyblends.

3. The composition of claim 2, wherein said thermoplastic polyester is present within the range of from about 30 to about 70 weight percent of said polyblend.

4. The composition of claim 1, wherein said thermoplastic polyester is a polyester of an aromatic dicarboxylic acid.

5. The composition of claim 4, wherein said polyester is a poly(alkylene terephthalate) comprising repeating units of the formula:

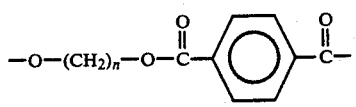

wherein n is an integer between 2 and 6.

6. The composition of claim 5, wherein said polyester is PET.

7. The composition of claim 1, wherein said thermoplastic polyester has an intrinsic viscosity of between about 0.4 and about 1.5 g/dL measured in a 60/40 vol.-/vol. ratio blend of 1,1,2,2-tetrachloroethane and phenol at 25° C.

8. The composition of claim 7, wherein said thermoplastic polyester has an intrinsic viscosity of between about 0.6 and about 1.1 g/dL measured in a 60/40 vol.-/vol. ratio blend of 1,1,2,2-tetrachloroethane and phenol at 25° C.

9. The composition of claim 1, wherein said second polymer comprises a polyamide prepared by condensing equimolar amounts of a saturated dicarboxylic acid having from 4 to 12 carbon atoms and a diamine of 4 to 14 carbon atoms, or by condensing omega-amino carboxylic acids, or by a poly-addition reacting of lactams.

10. The composition of claim 9, wherein said second polymer comprises a polyamide selected from the group consisting of poly(hexamethylene adipamide), poly(hexamethylene azelaic acid amide), poly(hexamethylene sebacic acid amide), poly(hexamethylene dodecane dicarboxylic acid amide), polycaprolactam, polylaurolactam, poly-11-aminoundecanoic acid, and poly(di-(p-aminocyclohexyl) methane dodecane dicarboxylic acid amide).

11. The composition of claim 10, wherein said polyamide comprises polycaprolactam.

12. The composition of claim 9, wherein said polyamide is present within the range of from about 5 to about 85 weight percent of said polyblend.

13. The composition of claim 12, wherein said polyamide is present within the range of from about 30 to about 70 weight percent of said polyblend.

14. The composition of claim 9, wherein said polyamide has a number average molecular weight of at least 20,000 daltons.

15. The composition of claim 1, wherein said second polymer comprises a polyolefin selected from the group consisting of polyethylene, polypropylene, and ethylene-propylene copolymers.

16. The composition of claim 15, wherein said polyolefin is a polyethylene selected from the group consisting of LDPE, HDPE and LLDPE.

17. The composition of claim 15, wherein said polyolefin is present within the range of from about 5 to about 85 weight percent of said polyblend.

18. The composition of claim 17, wherein said polyolefin is present within a range of from about 30 to about 70 weight percent of said polyblend.

19. The composition of claim 17, wherein said polyolefin has a Melt Index of 2.0 measured pursuant to ASTM D-1238.

20. The composition of claim 1, wherein said ethylene copolymer containing epoxy groups is present within the range of from about 1 to about 40 weight percent of said polyblend.

21. The composition of claim 20, wherein said ethylene copolymer containing epoxy groups is present within the range of from about 5 to about 30 weight percent of said polyblends.

22. The composition of claim 1, wherein Y is formed from vinyl acetate.

23. The composition of claim 1, wherein Y is formed from said acrylate monomer.

24. The composition of claim 23, wherein $R_1$ of said acrylate monomer is an alkyl or cycloalkyl group containing from about 1 to about 6 carbon atoms.

25. The composition of claim 23, wherein $R_2$ of said acrylate monomer is hydrogen.

26. The composition of claim 1, wherein Y is present in said ethylene copolymer in a range of from about 15 to about 30 weight percent.

27. The composition of claim 1, wherein Z of said ethylene copolymer is formed from a monomer selected from the group consisting of glycidyl acrylate and glycidyl methacrylate.

28. The composition of claim 27, wherein Z is formed from glycidyl methacrylate.

29. The composition of claim 1, wherein Z is present in said ethylene copolymer in a range from about 1 to about 10 weight percent.

30. The composition of claim 1, wherein X is present in said ethylene copolymer in a range from about 60 to about 84 weight percent.

31. The composition of claim 1, wherein said ethylene copolymer has a melt flow between about 2 and about 15 g/10 min. at 190° C. with a 2.16 kg weight as determined by ASTM D-1238.

32. The composition of claim 1, wherein said second polymer comprises a polyamide and said composition comprises from about 5 to about 85 weight percent of said thermoplastic polyester, from about 5 to about 85 weight percent of said polyamide, from about 1 to about 40 weight percent of said ethylene copolymer containing epoxy groups.

33. The composition of claim 32, wherein said polyamide is polycaprolactam, said thermoplastic polyester is PET and said ethylene copolymer containing epoxy groups is EEA-GMA.

34. The composition of claim 1, wherein said second polymer comprises a polyolefin and said composition comprises from about 5 to about 85 weight percent of said thermoplastic polyester, from about 5 to about 85 weight percent of said polyolefin, and from about 1 to about 40 weight percent of said ethylene copolymer containing epoxy groups.

35. The composition of claim 1, wherein said polyolefin is low density polyethylene, said thermoplastic polyester is PET and said ethylene copolymer containing epoxy groups is EEA-GMA.

36. A molded article prepared from the molding composition of claim 1.

37. A method of producing a molded polyblend which comprises:
(a) forming a thermoplastic polyblend comprising a first polymer comprising a thermoplastic polyester, one or more second polymers suitable for use in thermoplastic polyblends and selected from the group consisting of polyamides, polyolefins and mixtures thereof, and
an ethylene copolymer containing epoxy groups having the formula:

X/Y/Z wherein
X is a monomeric unit formed from ethylene comprising from about 50 to about 95 weight percent of said copolymer; and
Y is a monomeric unit formed from a monomer selected from the group consisting of vinyl acetate and an acrylate monomer having the structure:

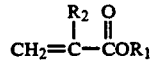

in which
$R_1$ is selected from the group consisting of alkyl and cycloalkyl groups containing from about 1 to about 12 carbon atoms and phenyl and alkylphenyl groups, the alkyl portion of which contains from about 1 to about 12 carbon atoms; $R_2$ is selected from the group consisting of hydrogen, methyl and ethyl; and wherein Y comprises from about 4 to about 35 weight percent of said copolymer; and
Z is a monomeric unit formed from a monomer selected from the group consisting of glycidyl acrylate and glycidyl methacrylate, comprising from about 1 to about 15 weight percent of said copolymer; and
(b) molding said polyblend.

38. A molded polyblend produced according to the process of claim 37.

* * * * *